United States Patent
Fillot et al.

(10) Patent No.: US 12,428,864 B2
(45) Date of Patent: Sep. 30, 2025

(54) SYSTEM AND METHOD FOR THERMOREGULATING A SWIMMING POOL

(71) Applicant: POLYTROPIC, Vourles (FR)

(72) Inventors: Jean-Christophe Fillot, St Genis Laval (FR); Fabrice Granier, Meyzieu (FR)

(73) Assignee: POLYTROPIC, Vourles (FR)

( * ) Notice: Subject to any disclaimer, the term of this patent is extended or adjusted under 35 U.S.C. 154(b) by 160 days.

(21) Appl. No.: 18/505,096

(22) Filed: Nov. 8, 2023

(65) Prior Publication Data
US 2024/0159072 A1    May 16, 2024

(30) Foreign Application Priority Data
Nov. 14, 2022  (FR) ..................................... 2211825

(51) Int. Cl.
*E04H 4/12*  (2006.01)
*H02J 3/00*  (2006.01)
*H02J 3/38*  (2006.01)

(52) U.S. Cl.
CPC ............ *E04H 4/129* (2013.01); *H02J 3/0075* (2020.01); *H02J 3/38* (2013.01); *H02J 2300/24* (2020.01); *H02J 2300/28* (2020.01)

(58) Field of Classification Search
CPC . E04H 4/129; H02J 3/0075; H02J 3/38; H02J 2300/28; H02J 2300/24
(Continued)

(56) References Cited

U.S. PATENT DOCUMENTS 5,584,992 A * 12/1996 Sugimoto ............... C02F 1/444
                                                                210/243
9,960,637 B2 * 5/2018 Sanders ................... H02J 15/00
(Continued)

FOREIGN PATENT DOCUMENTS

DE      102011103317 A1    11/2012
EP          3065021 A1      9/2016
(Continued)

OTHER PUBLICATIONS

EPO Translation for Publication No. DE102011103317A1.
FR 2211825, INPI Rapport de Recherche Preliminaire, May 2, 2023, 2 pages.

*Primary Examiner* — Jon T. Schermerhorn, Jr.
(74) *Attorney, Agent, or Firm* — Soquel Group LLC

(57) ABSTRACT

A system including a heat production unit for heating water of a pool, an electrical connection, a photovoltaic and/or wind-powered renewable electricity generator, the system configured to switch between a mains mode and a renewable mode, a temperature sensor, and a control unit. When the system is in renewable mode and the current temperature is less than a predetermined maximum temperature, the unit controls the heat production unit to heat the water. When the system is in mains mode and the current temperature is less than a predetermined minimum temperature, the unit controls the heat production unit to heat the water. When the system is in renewable mode and the current temperature falls below the minimum temperature, the unit switches the system to mains mode. When the system is in mains mode and the current temperature rises above the minimum temperature, the unit switches the system to renewable mode.

15 Claims, 2 Drawing Sheets

(58) Field of Classification Search
USPC .......................................................... 165/240
See application file for complete search history.

(56) References Cited

U.S. PATENT DOCUMENTS

| | | | |
|---|---|---|---|
| 11,067,296 B2* | 7/2021 | Callemo | F24D 3/18 |
| 2013/0025820 A1* | 1/2013 | Yang | F24T 10/10 |
| | | | 165/45 |
| 2016/0146508 A1* | 5/2016 | Gornik | F24S 20/02 |
| | | | 126/561 |
| 2024/0159072 A1* | 5/2024 | Fillot | E04H 4/129 |

FOREIGN PATENT DOCUMENTS

| | | | | |
|---|---|---|---|---|
| EP | 3392997 A1 | | 10/2018 | |
| GB | 2105585 A | * | 3/1983 | ............. E04H 15/22 |
| WO | WO-2020038177 A1 | * | 2/2020 | ............. F24S 10/50 |

* cited by examiner

SYSTEM AND METHOD FOR THERMOREGULATING A SWIMMING POOL

TECHNICAL FIELD OF THE INVENTION

The present invention concerns a system for thermoregulating a swimming pool, an installation including such a thermoregulation system, and a method for thermoregulating a swimming pool by such a system.

BACKGROUND OF THE INVENTION

Thermal regulation of pools, such as swimming pools or spas, is generally carried out by an electrical thermoregulation unit, connected to a collective source of electricity, in other words, to the mains. This thermal regulation may entail high cost for pool users, as well as a significant carbon footprint, as the mains electricity used is not always decarbonized. To reduce fossil fuel consumption, it is known to use renewable energies to power the electrical thermoregulation unit, for example solar energy, by photovoltaic panels. However, use of renewable energies is subject to several constraints, in particular intermittency of these energies, and in the case of solar energy, intermittency of sunshine, caused of course by day-night alternation, but also by changing weather conditions. For systems without a means of storing the electricity produced, this creates intermittence in the availability of electricity, making it difficult to maintain a stable water temperature in the pool.

SUMMARY OF THE INVENTION

The present invention remedies the drawbacks explained above, by providing a new thermoregulation system allowing a satisfactory temperature using decarbonized energy to be obtained, despite intermittency of its production, limiting recourse to electricity from a collective source of electricity.

To this end the invention has as its object a system for thermoregulating a pool containing water, the system comprising:
  a heat production unit, for heating the water in the pool, when the heat production unit is supplied with electricity,
  an electrical connection, the system being configured to operate in a mains mode in which a collective source of electricity supplies the heat production unit, by the electrical connection,
    a renewable electricity generator, photovoltaic and/or wind-powered, the system being configured to switch between the mains mode and a renewable mode in which the renewable electricity generator electrically supplies the heat production unit and in which the heat production unit is not supplied by the collective electricity source,
  a temperature sensor, to measure a current temperature of the water in the pool, and
  a control unit which:
  when the system is in renewable mode and as long as the current temperature is less than a predetermined maximum temperature, controls the heat production unit to heat the water in the pool,
  when the system is in mains mode and as long as the current temperature is lower than a predetermined minimum temperature, controls the heat production unit to heat the water in the pool, the predetermined minimum temperature being lower than the predetermined maximum temperature,
  when the system is in renewable mode and the current temperature falls below the minimum temperature, switches the system to mains mode, and
  when the system is in mains mode and the current temperature becomes higher than the minimum temperature, switches the system to renewable mode.

One feature of the invention, to obtain the desired temperature of the water in the pool, is to combine a collective source of electricity and a renewable electricity generator. In this way, the collective electricity source takes over in case the electricity from the renewable electricity generator is unavailable and if the current temperature falls below the minimum temperature, in order to heat the pool water and allow the current temperature to rise above the minimum temperature again. The disadvantages caused by the intermittent nature of renewable electricity production are thus resolved thanks to the combined use of renewable electricity and electricity from the collective source. The use of collective electricity is limited due to overheating the water in the pool to its maximum temperature. Indeed, when renewable electricity is no longer available, the current temperature drops, but takes time to reach the minimum temperature. This allows that electricity from the collective source need not be used to heat the pool during the period when the current temperature is above the minimum temperature. In other words, the water in the pool is used as a heat storage medium, to avoid having to use electricity from the collective source, despite the intermittent production of the renewable electricity The system may include one or more of the following features, taken alone or in any technically possible combination:
  The renewable electricity generator is a photovoltaic generator.
  The heat production unit is a heat pump.
  The system includes a cooling unit, electrically powered by the renewable electricity generator, for cooling the water in the pool when the current temperature is above the maximum temperature.
  The cooling unit and the heat production unit are formed by the same thermo-generator device, which is able to operate alternately according to a heat production mode and according to a cooling mode.
  The thermo-generator device is a heat pump.
  The present invention also provides an installation including the control system as described above, as well as the pool.

The installation may include one or more of the following features, taken in isolation or in any technically possible combination:
  The pool is a swimming pool.
  In renewable mode, when the maximum temperature is reached, the renewable electricity generator supplies electrical power to the domestic electrical equipment.
  The domestic electrical equipment includes devices for pumping, filtering and treating the water in the pool and/or household appliances.

The present invention also provides a method for thermoregulating a pool containing water, by the system described above. The method includes:
  heating the pool by the heat production unit on command from the control unit, when the system is in renewable mode and as long as the current temperature is less than the maximum temperature, heating the pool by the heat production unit on command from the control unit, when the system is in mains mode and as long as the current temperature is less than the minimum temperature, switching from renewable mode to mains mode when the current temperature falls below the minimum temperature, and switching from mains mode to renewable mode when the current temperature becomes higher than the minimum temperature.

The operating method may include one of the following features, taken alone or according to any technically possible combination:

The method further includes defining a setpoint temperature by a user, a step of defining a tolerance by the user and a step of calculating the minimum and maximum temperatures, respectively by subtracting the tolerance from the setpoint temperature, and by adding the tolerance to the setpoint temperature.

The method also includes cooling the water in the pool when the current temperature is higher than the maximum temperature.

The method also includes, when the system is in renewable mode and the maximum temperature of the pool water is reached, powering domestic electrical equipment by the renewable electricity generator.

BRIEF DESCRIPTION OF THE DRAWINGS

The invention will be better understood on reading the following description, given by way of example only and made with reference to the drawings on which.

DETAILED DESCRIPTION

Figure 1:
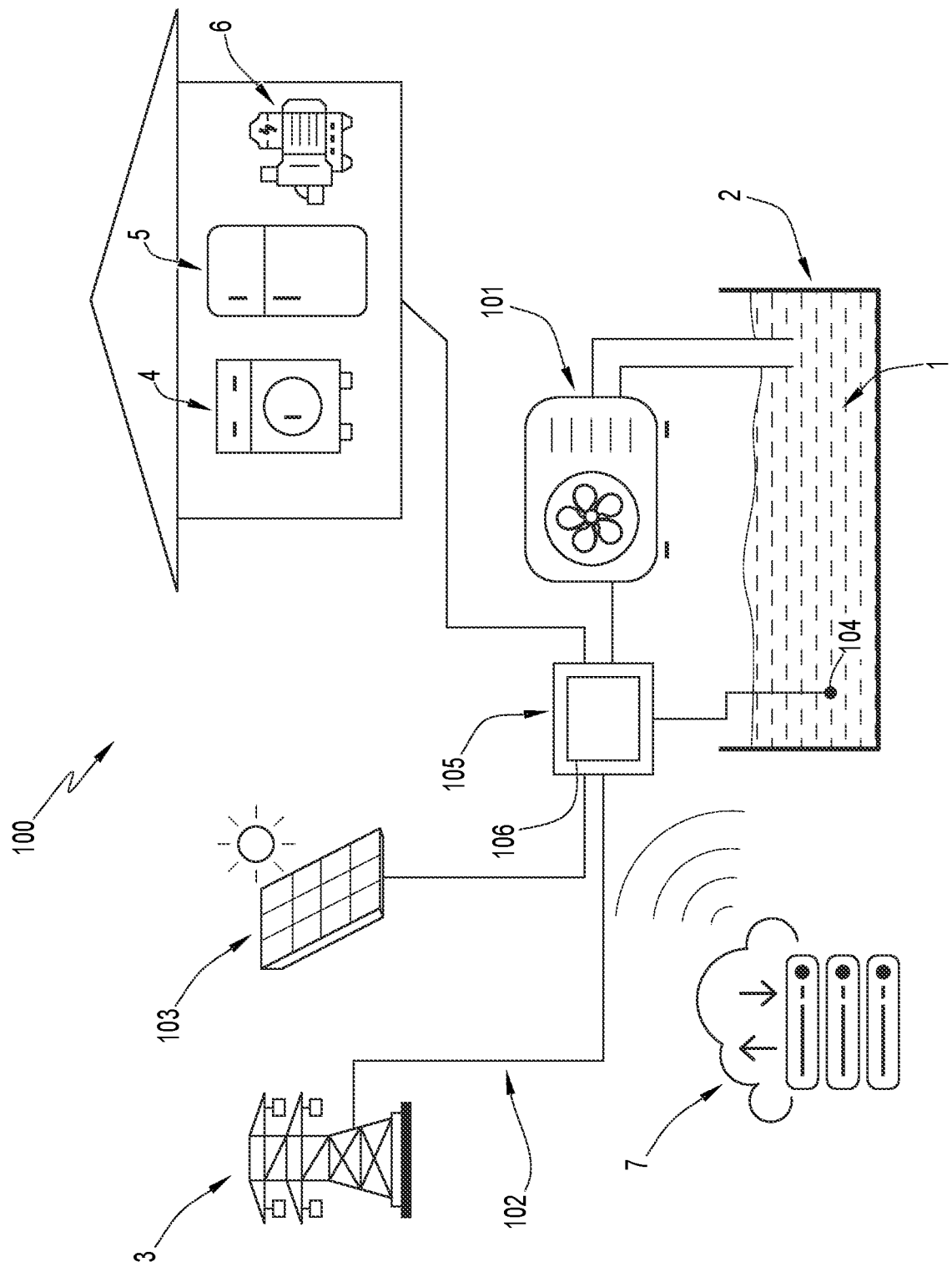
FIG. 1 is a simplified diagram showing an installation according to embodiments of the invention.

FIG. 1 shows an installation including a thermoregulation system 100 for a pool 2. For example, pool 2 may be a swimming pool, a spa, or any other in-ground or above-ground pool intended for outdoor or sheltered bathing. Pool 2 contains water 1 in which one or more people can bathe and/or swim. Thermoregulation system 100 is designed to regulate a current temperature Tc of water 1.

System 100 includes a thermo-generator device 101, an electrical connection 102, a renewable electricity generator 103, a temperature sensor 104, and a control unit 105.

Thermo-generator device 101 forms a heat production unit. Advantageously, thermo-generator device 101 may also form a cooling unit. Thermo-generator device 101 may, for example, and as shown in FIG. 1, be a heat pump, which may operate according to a heat generation mode and a cooling mode, to form both the heat generation unit and the cooling unit.

When electrically powered, the function of thermo-generator device 101, or at least the heat production unit, is to heat water 1 in pool 2, i.e., to raise the current temperature Tc. It may also be provided that, when electrically powered, thermo-generator device 101, or at least the cooling unit, can cool water 1 in pool 2, i.e., lower the current temperature Tc. In practice, thermo-generator device 101 may include a heat exchanger that supplies heat to water 1 to heat it or removes heat from water 1 to cool it.

Electrical connection 102 connects system 100 to a collective source of electricity 3, in order to supply system 100 with electricity from collective source of electricity 3. In particular, electrical connection 102 is used to supply electrical power to thermo-generator device 101, so that it heats water 1 in pool 2 and, optionally, so that it cools water 1 in pool 2. Collective source of electricity 3 may be a low-voltage distribution network.

Renewable electricity generator 103 may include at least one photovoltaic panel, and thus constitute a photovoltaic generator. Alternatively, or additionally, renewable electricity generator 103 may include at least one wind turbine, and thus constitute a wind turbine generator.

Renewable electricity generator 103 is configured to electrically power thermo-generator device 101, so that it heats water 1 in pool 2 and optionally, so that it cools water 1 in pool 2. Preferably, renewable electricity generator 103 may also be configured to electrically power domestic electrical equipment 4 and 5. Of course, a greater number of domestic electrical appliances other than 4 and 5 may be powered, the domestic electrical appliances not being limited, household electrical appliances such as refrigerators, washing machines and lighting systems, but also appliances for allowing pool 2 to operate, such as appliances 6 for pumping, filtering and treating water 1.

Temperature sensor 104 measures the current temperature Tc of water 1 in pool 2. Temperature sensor 104 may be a wired or wireless sensor.

Advantageously, control unit 105 is powered by renewable electricity generator 103 and by collective electricity source 3 by electrical connection 102, and powers thermo-generator device 101, so that thermo-generator device 101 is electrically powered by renewable electricity generator 103 and/or collective electricity source 3 by control unit 105.

Control unit 105 controls the current temperature Tc of water 1 in pool 2 by temperature sensor 104, for example, by being wired or wirelessly connected to temperature sensor 104. Depending on the measured current temperature value Tc, control unit 105 controls thermo-generator device 101 to heat water 1 in pool 2, or optionally, to cool water 1 in pool 2. Control unit 105 also determines by which means thermo-generator device 101 is electrically powered, namely by renewable electricity generator 103, by collective electricity source 3, or optionally by both at the same time. Control unit 105 may control renewable electricity generator 103 to electrically supply domestic electrical equipment 4, 5 and/or 6, alternatively or in addition to thermo-generator device 101.

Control unit 105 may include or be associated with an interface 106 allowing progress of system 100 to be monitored and, advantageously, for a user to enter control parameters for system 100. Interface 106 may be formed by an application carried out on a mobile terminal, for example a smartphone, available to the user. Alternatively, or in addition, interface 106 may present in the form of a fixed terminal, arranged close to pool 2. Interface 106 may advantageously be used by the user to view all the data from system 100, in particular the current temperature Tc measured by temperature sensor 104, the power supply to system 100, as well as the current operating mode of thermo-generator device 101. Control unit 105 may be an electronic card, or an application available on a computer or smartphone. All or part of control unit 105 may advantageously be a dematerialized server in a cloud 7. In this case, the server may host an artificial intelligence.

System 100 is configured to switch between two operating modes: a mains mode in which system 100 is supplied electrically by collective source of electricity 3 via electrical connection 102, and a renewable mode in which renewable electricity generator 103 supplies thermo-generator device 101, in particular the heat production unit, the heat production unit then not being supplied by collective source of electricity 3. Renewable electricity generator 103 may only operate when a corresponding renewable energy source, for example the sun, if generator 103 is photovoltaic, or the wind, if the generator 103 is wind-powered, is available. Thus, generator 103 may only supply electrical power to device 101 when the renewable energy source is available. In the event that the renewable energy source is not available or is too weak, it is therefore advantageous to supplement the electrical supply provided by renewable generator 103 with that provided by collective source of electricity 3, to electrically supply thermo-generator device 101, and thus still be able to heat and/or cool water 1 in pool 2. Intermittence of renewable electricity generator 103 therefore has no impact on the ability of system 100 to thermoregulate water 1, thanks to collective source 3, used in mains mode. In renewable mode, thermo-generator 101 is powered by renewable electricity generator 103, thus allowing use of decarbonized energy produced locally in the vicinity of pool 2.

Control unit 105 controls the power supply mode of thermo-generator device 101. On command from control unit 105, when system 100 is in mains mode, thermo-generator device 101 is powered by collective source 3 via electrical connection 102. On command from control unit 105, when system 100 is in renewable mode, thermo-generator device 101 is powered by renewable electricity generator 103 and is not powered by collective source 3 via electrical connection 102.

Advantageously, control unit 105 may adjust energy consumption of thermo-generator device 101 so as not to consume more than the power that is available at the output of renewable electricity generator 103. Thermo-generator device 101 may therefore be operated according to several power ranges, so as to consume only the power available. For example, thermo-generator 101 is rated at 1.5 kilowatts (kW). In the event that system 100 is in renewable mode, but renewable electricity generator 103, for example due to sub-optimal weather conditions, only supplies 1 kW, control unit 105 adjusts the consumption of thermo-generator device 101 so that it only consumes the 1 kW supplied by the renewable electricity generator 103. This allows the electricity consumption to be limited to only what is generated by renewable electricity generator 103 when system 100 is in renewable mode and avoids using electricity from collective source of electricity 3.

According to a particularly advantageous embodiment, the user can define a desired setpoint temperature T using interface 106 of control unit 105, as well as, preferably, the maximum temperature Tmax and a minimum temperature Tmin of water 1 in pool 2. For example, the user may define the setpoint temperature T as being 28° C., the minimum temperature Tmin as being 25° C. and the maximum temperature Tmax as being 30° C. Alternatively, the user may define the setpoint temperature T, as well as a tolerance around the setpoint temperature T, in other words, a temperature value, defining an interval within which the current temperature Tc may be included. The minimum Tmin and maximum Tmax temperatures are then carried out by control unit 105, by subtracting the tolerance from the setpoint temperature T to obtain the minimum temperature Tmin and adding the tolerance to setpoint temperature T to obtain the maximum temperature Tmax. For example, the user may define the setpoint temperature T as being 28° C. with a tolerance of 2° C. According to this example, the maximum temperature Tmax calculated by control unit 105 is then 30° C. and the minimum temperature Tmin calculated by the control unit 105 is then 26° C. In an alternative temperature definition mode, the user may define a first tolerance for calculating the minimum temperature Tmin and a second tolerance, different from the first tolerance, for calculating the maximum temperature Tmax. For example, the user may define the setpoint temperature T as 28° C., the first tolerance as 1° C. and the second tolerance as 3° C. In this case, the minimum temperature Tmin is 27° C. and the maximum temperature Tmax is 31° C. The maximum temperature Tmax, or minimum temperature Tmin, may be equal to the setpoint temperature T.

According to a variant not shown, the thermo-generator device forms a heat generation unit which is a heat pump, and does not form a cooling unit.

According to another variant not shown, the thermo-generator device forms a heat production unit which is a heat pump, and the thermo-generator device also forms a cooling unit, which is a separate piece of equipment from the heat pump, and is for example a water chiller. The cooling unit, when electrically powered, can cool the water in the pool, in other words lower the current temperature.

Figure 2:
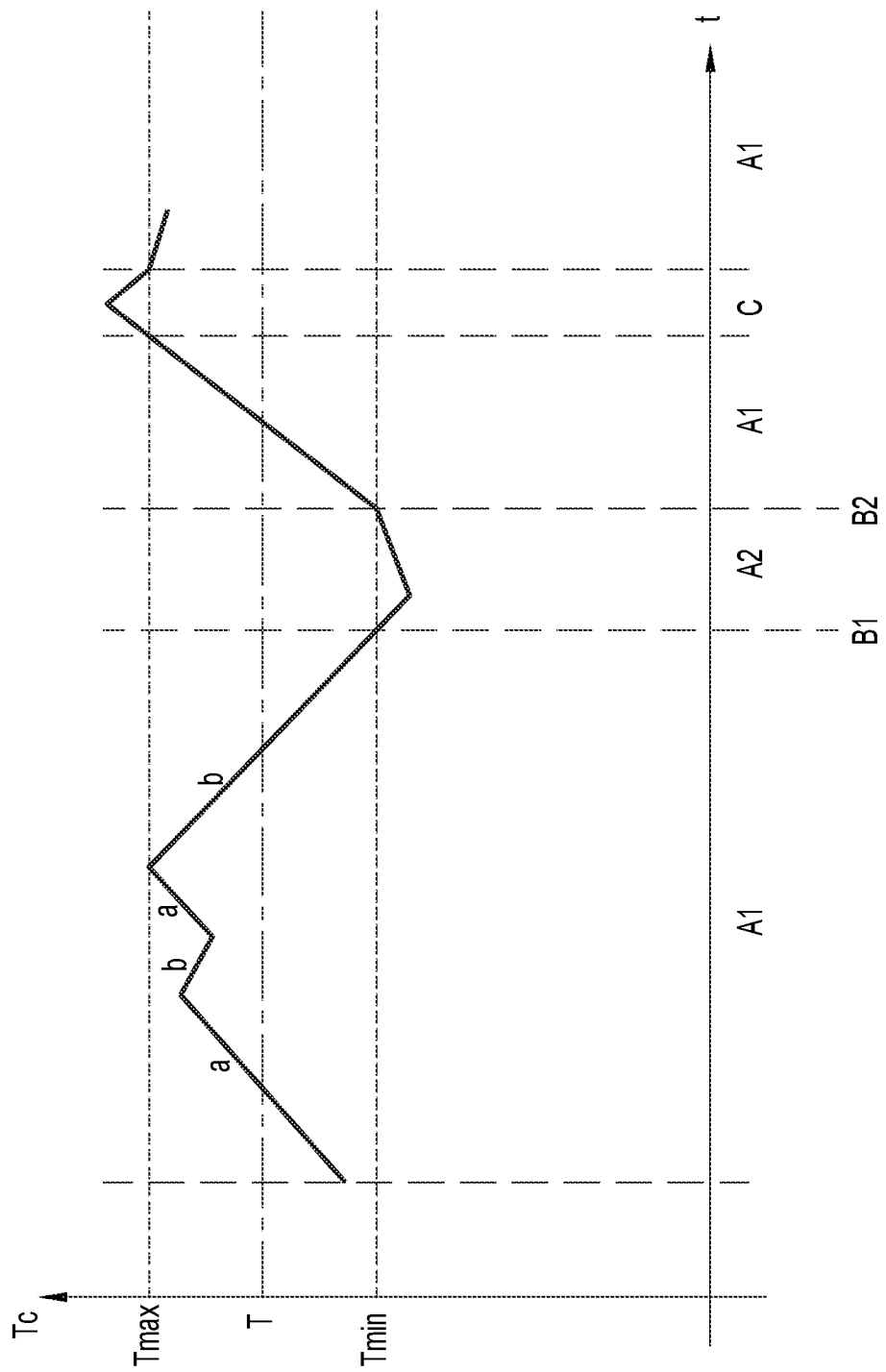
FIG. 2 is a graph depicting a thermoregulation method for the installation shown in FIG. 1, according to embodiments of the invention.

FIG. 2 represents a graph showing an example of the current temperature Tc as a function of time, to illustrate a method for thermoregulating water 1 in pool 2, implemented using system 100. During an operation A1 of the method, the current temperature Tc is less than the minimum temperature Tmin, system 100 is in renewable mode, renewable electricity generator 103 supplies thermo-generator device 101 and collective electricity source 3 does not supply thermo-generator device 101. During this operation A1, control unit 105 controls thermo-generator 101 so that it heats water 1 in pool 2. As a result of this heating, the current temperature Tc rises, as shown in the segments a. When system 100 is in renewable mode and renewable electricity is unavailable or in short supply, for example, because renewable electricity generator 103 is unable to produce electricity, for example, due to a lack of wind and/or sunshine, thermo-generator device 101 is unable to heat water 1 in pool 2 sufficiently to counteract heat losses. The current temperature Tc falls, as shown in the segments b.

During an operation B1 of the method, the current temperature Tc falls below the minimum temperature Tmin. As a result, control unit 105 switches system 100 from renewable mode to mains mode. Control unit 105 modifies the power supply to thermo-generator device 101 so that it is supplied by collective source 3 via electrical connection 102. Control unit 105 operates thermo-generator device 101 to heat water 1 in pool 2.

During an operation A2 of the method, when the current temperature Tc is less than the minimum temperature Tmin, system 100 is provided to be in mains mode. I.e., on command from control unit 105, thermo-generator 101 is powered by collective source 3 to heat water 1 in pool 2.

During an operation B2, the current temperature Tc becomes higher than the minimum temperature Tmin. As a result, system 100, on command from control unit 105, switches from mains mode to renewable mode. Control unit 105 modifies the power supply to thermo-generator device 101, which is then supplied with electricity from renewable electricity generator 103. Control unit 105 controls thermo-generator device 101 to heat water 1 in pool 2.

During an operation C, the current temperature Tc becomes higher than the maximum temperature Tmax. System 100 is then provided to be in renewable mode. If thermo-generator device 101 forms a cooling unit, then control unit 105 stops operation of thermo-generator device 101 to heat water 1 in pool 2, and commands thermo-generator device 101 to start operating to cool water 1 in pool 2. If thermo-generator device 101 does not form a cooling unit, then control unit 105 commands thermo-generator device 101 to stop heating water 1 in pool 2. When the current temperature Tc falls below the maximum temperature Tmax, then system 100 operates again according to operation A1, with the operation explained above.

Being able to heat water 1 in pool 2 up to the maximum temperature Tmax allows energy to be stored in the form of heat in water 1 in pool 2, in order to delay use of electricity from collective source 3 as long as possible, despite intermittent production of renewable electricity generator 103. Indeed, thanks to this heat storage, the current temperature Tc of water 1 in pool 2 takes longer to fall below the minimum temperature Tmin than if water 1 of pool 2 had only been heated up to the set temperature T. During this time, thermo-generator 101 is not supplied with electricity from collective electricity source 3. Heat storage is carried out using electricity from renewable electricity generator 103, thus optimizing use of electricity from the renewable electricity generator, rather than losing it, in the event that system 100 has no other means of storing electricity from renewable electricity generator 103.

The invention claimed is:

1. A system for thermoregulating a pool containing water, the system comprising:
    a heat production unit, for heating the water of the pool, when the heat production unit is electrically powered;
    an electrical connection, the system being configured to operate in a mains mode in which a collective electricity source supplies said heat production unit, via the electrical connection;
    a renewable electricity generator, photovoltaic or wind, the system being configured to switch between the mains mode and a renewable mode in which the renewable electricity generator electrically supplies said heat production unit and in which said heat production unit is not supplied by the collective electricity source;
    a temperature sensor, to measure a current temperature of the water in the pool, and
    a control unit, which:
        when the system is in renewable mode and as long as the current temperature is less than a predetermined maximum temperature, controls said heat production unit to heat the water in the pool,
        when the system is in mains mode and as long as the current temperature is less than a predetermined minimum temperature, controls said heat production unit to heat the water in the pool, the predetermined minimum temperature being less than the predetermined maximum temperature,
        when the system is in renewable mode and the current temperature falls below the minimum temperature, switches the system to mains mode, and
        when the system is in mains mode and the current temperature is above the minimum temperature, switches the system to renewable mode.

2. The system according to claim 1, wherein said renewable electricity generator is a photovoltaic generator.

3. The system according to claim 1, wherein said renewable electricity generator is a wind generator.

4. The system according to claim 1, wherein said heat production unit is a heat pump.

5. The system according to claim 1, further comprising a cooling unit, electrically powered by said renewable electricity generator, for cooling the water in the pool when the current temperature is above the maximum temperature.

6. The system according to claim 5, wherein said cooling unit and said heat-generating unit are formed by a single thermo-generator device, which is able to operate alternately in a heat-generating mode and in a cooling mode.

7. The system according to claim 6, wherein the thermo-generator device is a heat pump.

8. An installation, comprising:
    the thermoregulation system according to claim 1; and
    the pool.

9. The installation according to claim 8, wherein said pool is a swimming pool.

10. The installation according to claim 8, wherein, in renewable mode, when the maximum temperature is reached, the renewable electricity generator electrically powers domestic electrical equipment.

11. The installation according to claim 10, wherein the domestic electrical equipment comprises (i) devices for pumping, filtering and treating the water in the pool, or (ii) household appliances.

12. A method for thermoregulating a pool containing water, by the system according to claim 1, the method comprising:
    heating the pool by the heat production unit on command from the control unit, when the system is in renewable mode and as long as the current temperature is less than the maximum temperature;
    heating the pool by the heat production unit on command from the control unit, when the system is in mains mode and as long as the current temperature is less than the minimum temperature,
    switching from renewable mode to mains mode when the current temperature falls below the minimum temperature; and
    switching from mains mode to renewable mode when the current temperature rises above the minimum temperature.

13. The method according to claim 12, further comprising:
    defining a setpoint temperature by a user;
    defining a tolerance by the user; and
    calculating the minimum and maximum temperatures, respectively by subtracting the tolerance from the setpoint temperature, and adding the tolerance to the setpoint temperature.

14. The method according to claim 12, further comprising cooling the water in the pool when the current temperature is higher than the maximum temperature.

15. The method according to claim 12, the method further comprising, when the system is in renewable mode and the maximum temperature of the pool water is reached, powering domestic electrical equipment by the renewable electricity generator.

* * * * *